United States Patent [19]
Bilas

[11] 3,770,320
[45] Nov. 6, 1973

[54] TILTABLE MOUNTING FOR DUMP TRUCK BODIES

[76] Inventor: Michael Bilas, 2730 Columbiana-New Castle Rd., New Springfield, Ohio 44443

[22] Filed: Sept. 18, 1972

[21] Appl. No.: 290,172

[52] U.S. Cl. .................................... 298/17 S
[51] Int. Cl. .................................... B60p 1/04
[58] Field of Search ............... 298/17 S, 17.5, 11; 280/6

[56] References Cited
UNITED STATES PATENTS
| | | | |
|---|---|---|---|
| 3,671,073 | 6/1972 | Bilas | 298/17 S |
| 3,398,967 | 8/1968 | Brocklebank | 280/6 R |
| 3,041,111 | 6/1962 | Wyrick | 298/17 S |

FOREIGN PATENTS OR APPLICATIONS
422,533  1/1935  Great Britain ................... 298/11

Primary Examiner—Richard J. Johnson
Attorney—Webster B. Harpman

[57] ABSTRACT

A tiltable mounting for dump truck bodies positions a cylindrical member for rotation on its axis and mounts a shaft longitudinally of the cylindrical member and diagonally with respect thereto. Vertically slotted brackets cage the ends of the shaft beyond the ends of the cylindrical member so that rotation of the cylindrical member moves the shafts vertically in opposite upward and downward motion. The dump truck body is pivoted on said shafts and is thereby tiltable transversely relative to the wheel and axle assemblies of the dump truck.

7 Claims, 4 Drawing Figures

PATENTED NOV 6 1973 3,770,320

TILTABLE MOUNTING FOR DUMP TRUCK BODIES

BACKGROUND OF THE INVENTION

1. Field of the Invention

This invention relates to dump trucks having bodies pivoted to the truck frame and means for elevating the bodies so as to dump the contents therefrom and wherein the pivoting means may be moved to tilt the dump truck body transversely.

2. Description of the Prior Art

Prior structures of this type have usually provided only for a pivotal relation between the truck frame and the dump truck body with the result that upon the sinking of one of the truck wheel assemblies into a soft supporting surface imposing a transverse tilt to the truck frame, the elevated dump body moves sidewardly to a degree making a further dumping action impossible and frequently tipping over the entire dump truck. A prior art proposal to meet the problem is found in patent No. 3,041,111 and a leveling device of somewhat similar operating characteristic is found in U.S. Pat. No. 3,398,967. My prior U.S. Pat. No. 3,671,073 discloses a device for accomplishing the desired result which is structurally quite different from that of the present invention.

This invention eliminates the problems of the prior art structures and provides an easy to form and install mechanism in existing dump truck constructions.

SUMMARY OF THE INVENTION

A tiltable mounting for dump truck bodies comprises a cylindrical member rotatably mounted in the frame work of the dump truck and having a shaft disposed longitudinally therethrough and diagonally with respect to the axis thereof and extending out of the ends thereof with slotted brackets caging the shafts so as to permit the same to move vertically in oppositely disposed upward and downward motion when the cylindrical body member is partially rotated. The dump truck body is pivoted on and movable by the shafts.

DESCRIPTION OF THE PREFERRED EMBODIMENT

Figure 1:
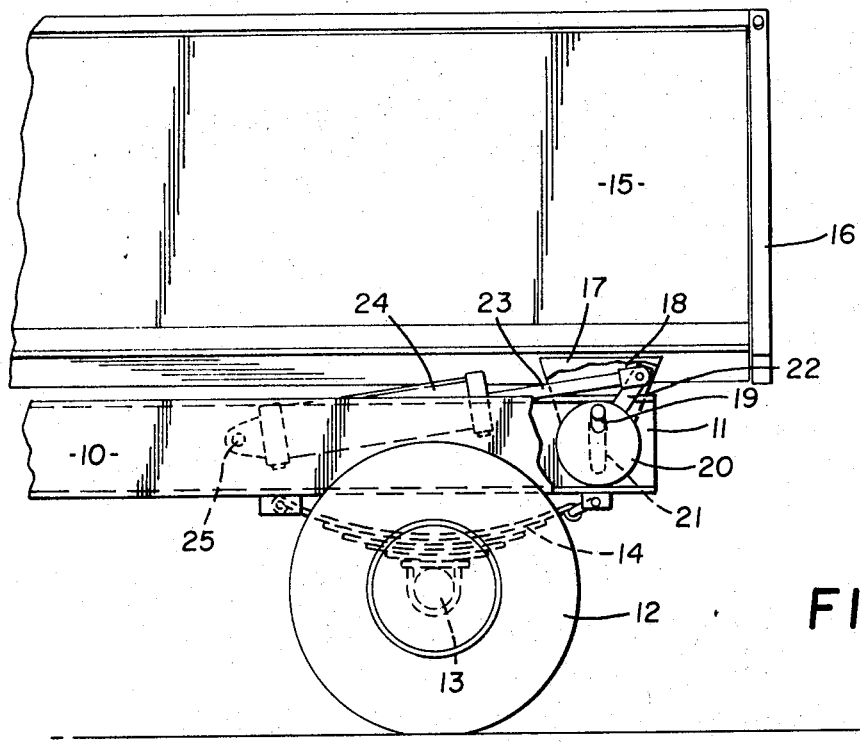
FIG. 1 is a side elevation of parts broken away and parts in cross section illustrating a portion of a dump truck frame and dump truck body with the tiltable mounting in position thereon.
Figure 4:
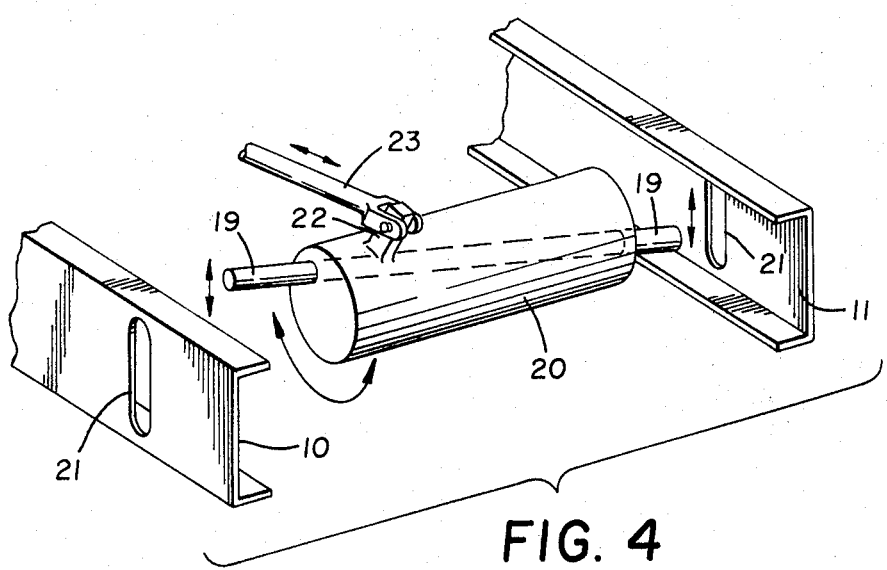
FIG. 4 is an exploded diagrammatic illustration showing the rotatable cylindrical member and its diagonally positioned shaft and the means caging the shaft and resulting in vertical movement of the shaft when the cylindrical member is rotated.

By referring to the drawings and FIG. 1 in particular it will be seen that a portion of a dump truck has been disclosed including main frame members 10 and 11, ground engaging wheels 12 are positioned thereunder by an axle 13 which is attached to the frame members 10 and 11 by spring assemblies 14 as will be understood by those skilled in the art. A dump truck body 15, having a swingable tailgate 16 is provided with means not shown for elevating one end thereof and the other end, as illustrated, is provided with spaced depending brackets 17 and 18 apertured adjacent their lower ends where they are engaged on the opposite ends of a shaft 19 which in turn is positioned longitudinally of a cylindrical member 20 and diagonally thereof with respect to the axis thereof as best seen in FIG. 4 of the drawings. The frame members 10 and 11 of the truck body are provided with vertical slots 21 through which the ends of the shaft 19 extend.

It will thus be seen that the dump body 15 can be tilted transversely by rotating the cylindrical member 20 and thereby changing the relative position of the ends of the shaft 19 which will move oppositely, upwardly and downwardly in the slots 21 in the frame members 10 and 11. In order to partially rotate the cylindrical member 20 an arm 22 is positioned outwardly from one side thereof and pivotally engaged to one end of a piston rod 23 of a piston and cylinder assembly 24, the other end of which is pivotally engaged to the frame members 10 and 11 of the truck body as by a transverse pivot 25. Means not shown connects the cylinder 24 with a source of hydraulic fluid under pressure such as in normally available on a dump truck for actuating the lifting cylinder thereof and valve means in connection means enable the cylinder 24 to be operated to move the piston rod 23 thereof so as to impart partial rotation to the cylindrical member 20.

Figure 2:
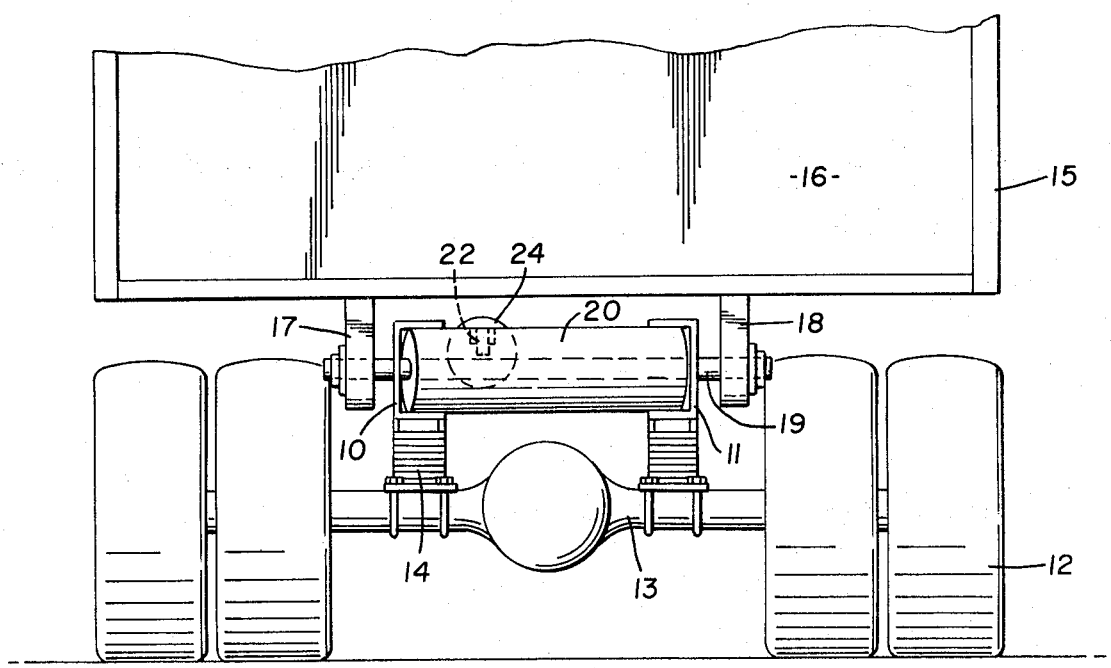
FIG. 2 is a rear elevation of a dump truck and body with parts broken away and showing the wheels and axle and frame of the dump truck on level ground.

By referring now to FIG. 2 of the drawings, a rear elevation of a dump truck equipped with the device of the invention and positioned on level ground may be seen and it will be observed that the cylindrical body member 20 is rotated to a position where the shaft 19 positioned longitudinally thereof is on a horizontal plane with the result that the dump truck body 16 is transversely level.

Figure 3:
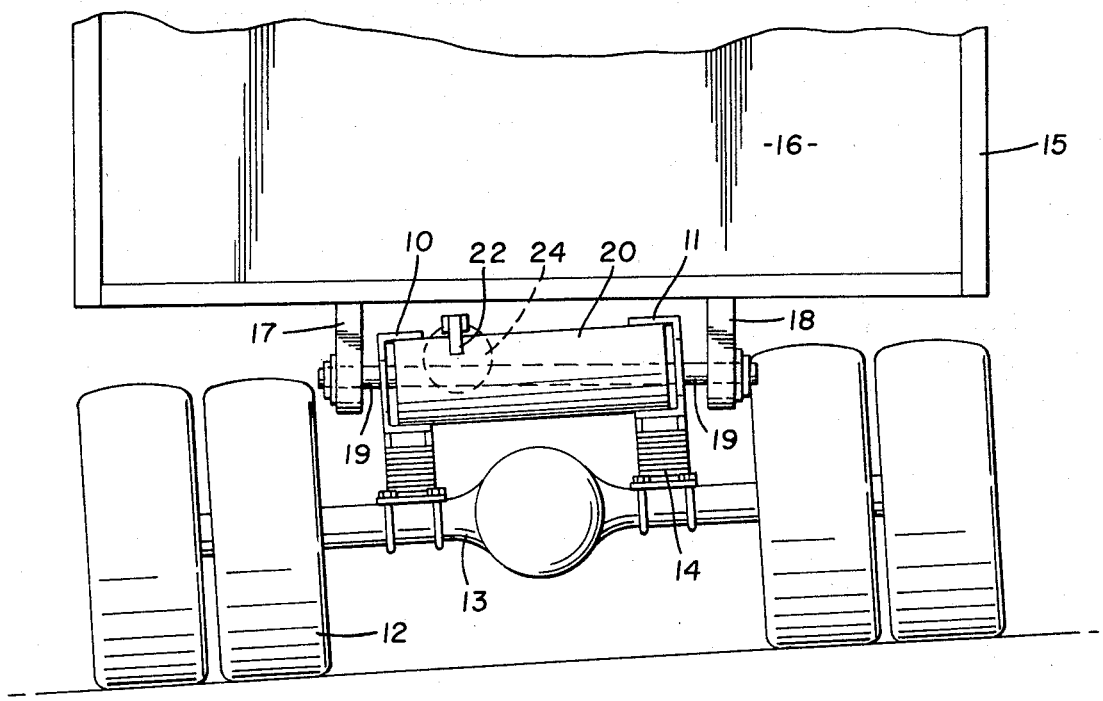
FIG. 3 is a rear elevation of a dump truck and body with parts broken away and showing the wheels and axle and truck frame on tilted ground with the tilting means supporting the body moved to a position compensating for the tilt of the axle and frame of the truck to maintain the body on a level plane.

By referring now to FIG. 3 of the drawings, the wheels 12, axle 13 and frame members 10 and 11 of the dump truck are shown on a transversely inclined surface such as for example would be the case if the left hand wheels 12 were positioned on soft ground and settled partially thereinto.

Still referring to FIG. 3 it will be seen that the piston and cylinder assembly 24 has been actuated so as to move the arm 22 and thereby partially rotate the cylinder 20 and change the relative position of the diagonal shaft 19 positioned therethrough. As the shaft 19 is caged in the vertical slots 21 heretofore referred to, the left end of the shaft 19 will move upwardly and the right end of the shaft 19 will move downwardly and the cylindrical member 20 will change its position slightly relative to the frame members 10 and 11 on which it is slidably engaged so as to bring the dump truck body 16 into transversely level position as shown. Those skilled in the art will observe that 90° rotation of the cylindrical member 20 will be sufficient to change the relative positions of the shaft 19 and thereby move the dump truck body as hereinbefore disclosed.

The structure is versatile in that it can be used on many types of vehicles where it is desirable to maintain the body in fixed or tilted relation to the supporting frame at different times and it will occur to those skilled in the art that the cylindrical member may be carried on bearings so as to reduce the energy necessary to rotate the same and it will also occur to those skilled in the art that the cylindrical body 20 may be formed as a pair of wheel-like members spaced with respect to one another and with the shaft 19 positioned therethrough and offset from the centers thereof and each of the wheel-like members provided with means for slidably supporting their lower surfaces which may comprise antifriction bearings.

Although but one embodiment of the present invention has been illustrated and described it will be apparent to those skilled in the art that various changes and modifications may be made therein without departing from the spirt of the invention.

I claim:

1. In a vehicle having a frame and a body carried thereby, means for tilting the body transversely relative to said frame, said means consisting of a shaft positioned transversely of said frame, means for mounting said shaft for generally vertical movement at least one cam on said shaft, said shaft positioned through said cam diagonally, means supporting said cam for movement relative to said frame and means for imparting partial rotary motion to said cam so as to move the ends of the shaft in opposite upward and downward motion, said body carried on said ends of said shaft so as to be tiltable transversely thereby.

2. The product of claim 1 wherein the vehicle is a dump truck and the body is pivoted to the ends of the shaft.

3. The product of claim 1 wherein the means for imparting motion to the cam consists of a hydraulic motor on said frame and having a drive shaft engaged on said cam.

4. The product of claim 1 wherein there are two cams which are respectively positioned inwardly from the ends of said shaft.

5. The product of claim 1 wherein the means mounting said shaft are oppositely disposed vertically formed slots in said frame.

6. The product of claim 1 wherein the cam is a cylindrical member.

7. The product of claim 5 wherein the ends of the cylindrical member are movably engaged on said frame.

* * * * *